Figure 1:
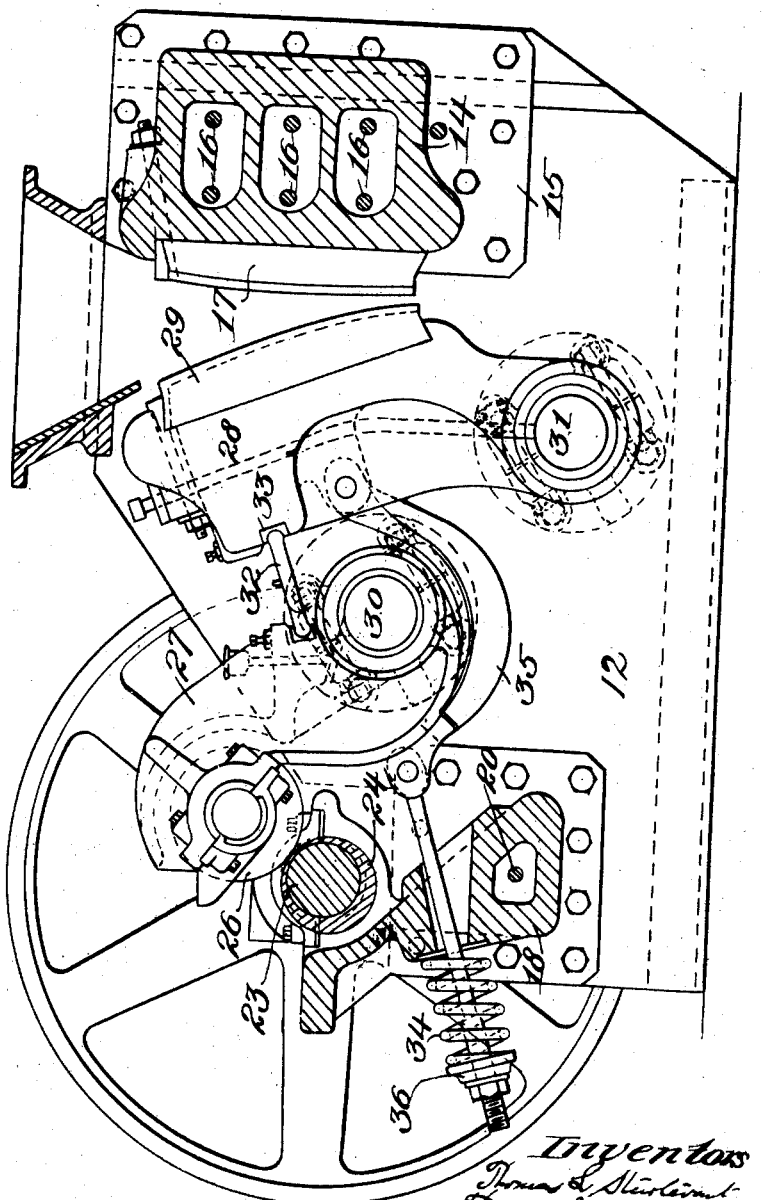

No. 864,573.

PATENTED AUG. 27, 1907.

T. L. & T. J. STURTEVANT.
CRUSHER.
APPLICATION FILED APR. 29, 1907.

5 SHEETS—SHEET 1.

Witnesses:
Inventors

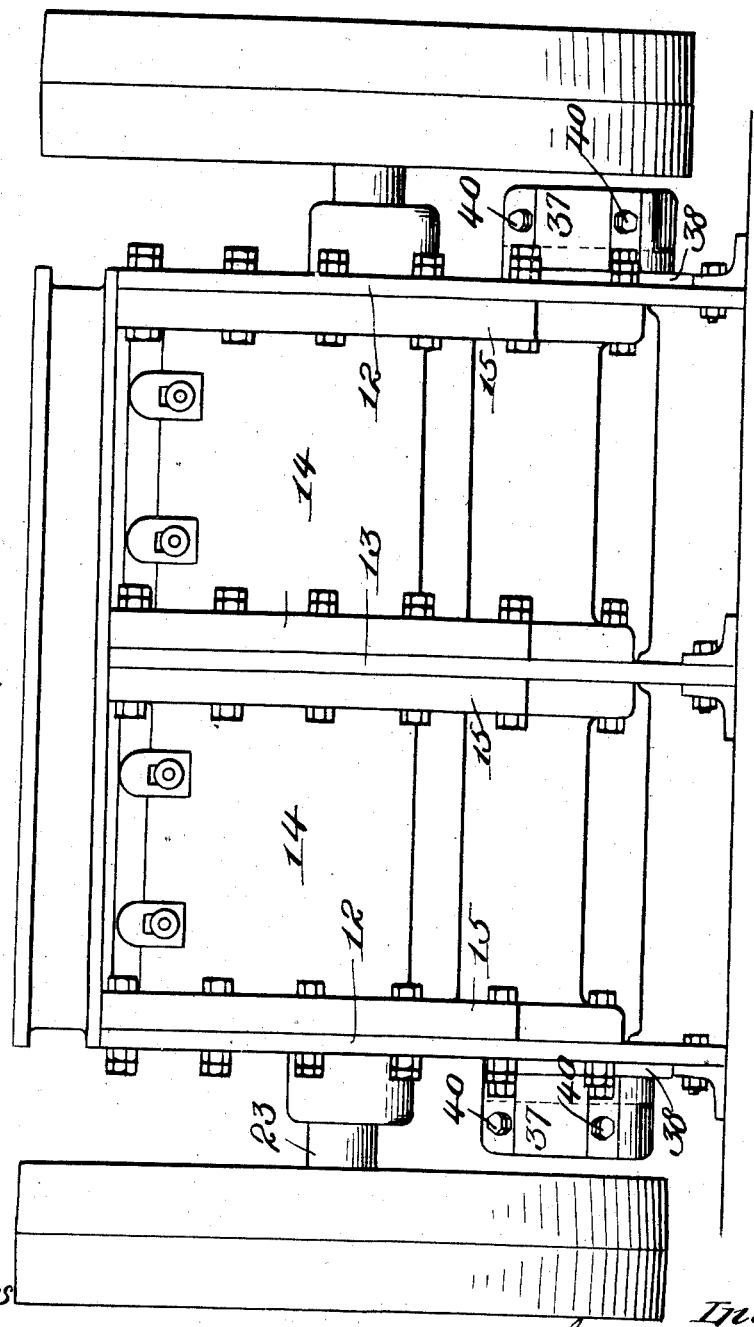

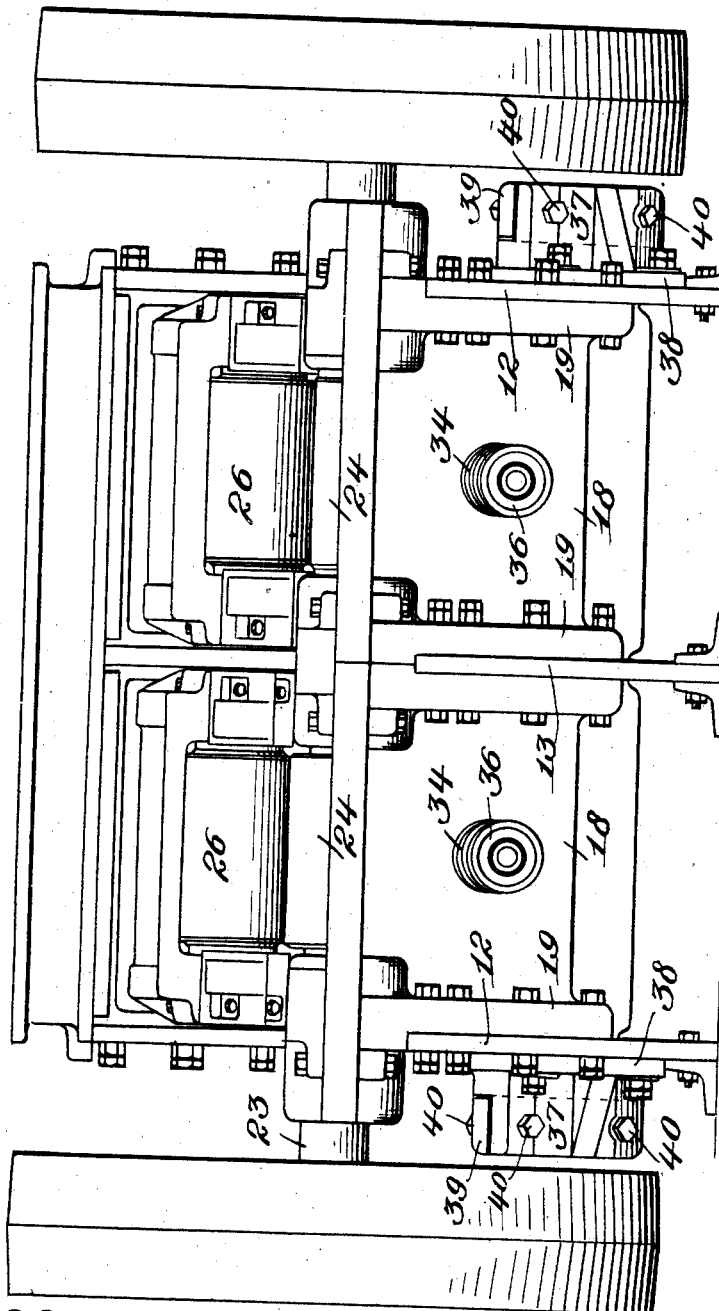

No. 864,573. PATENTED AUG. 27, 1907.
T. L. & T. J. STURTEVANT.
CRUSHER.
APPLICATION FILED APR. 29, 1907.
5 SHEETS—SHEET 4.
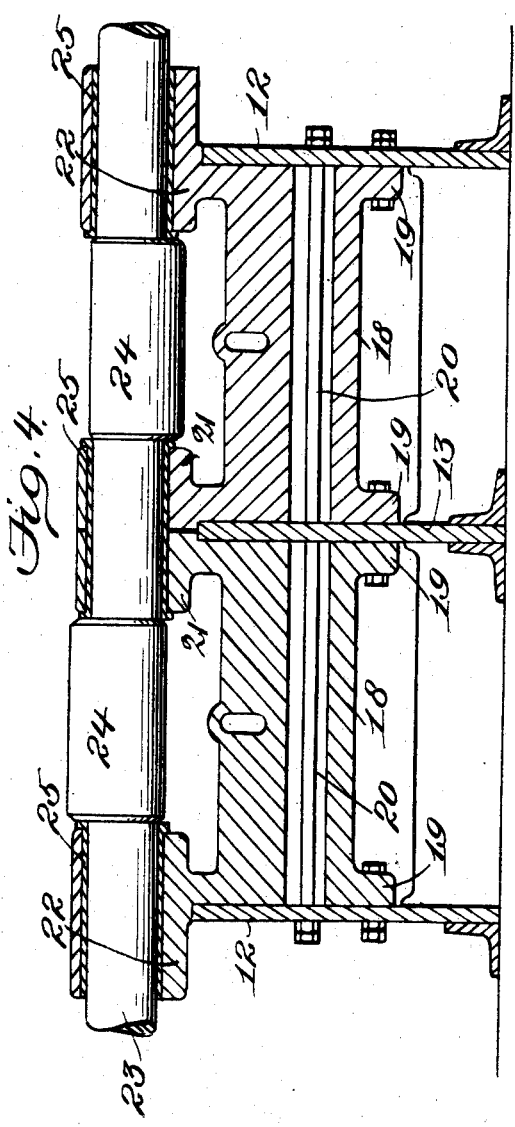
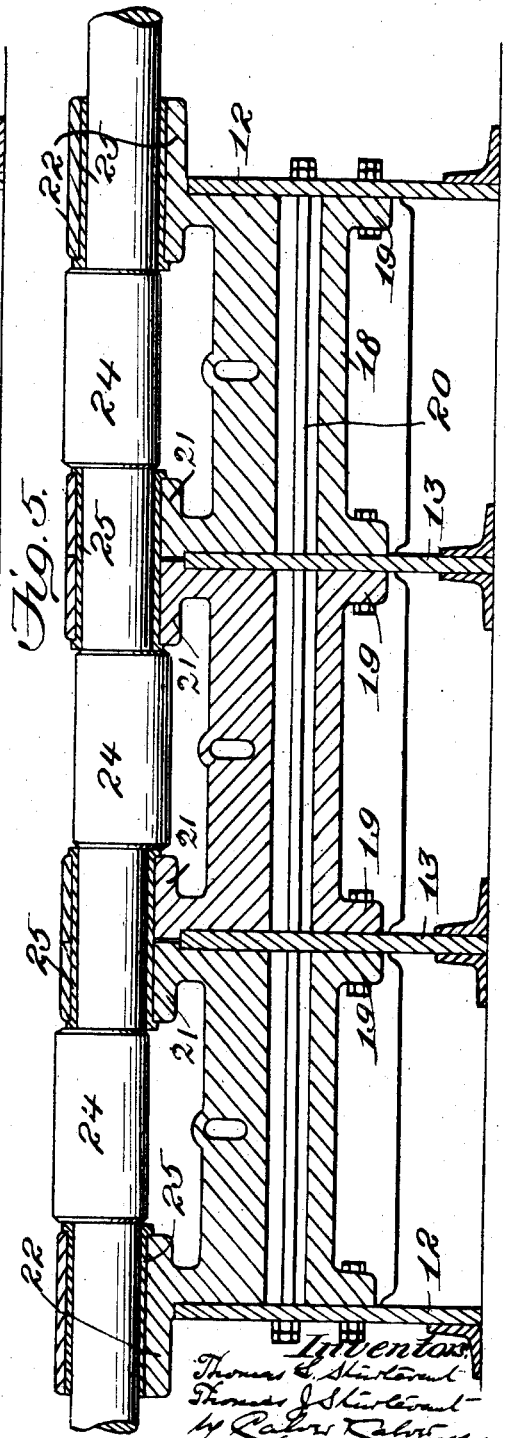

No. 864,573. PATENTED AUG. 27, 1907.
T. L. & T. J. STURTEVANT.
CRUSHER.
APPLICATION FILED APR. 29, 1907.

5 SHEETS—SHEET 5.

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, OF PORTLAND, MAINE, A CORPORATION OF MAINE.

CRUSHER.

No. 864,573.  Specification of Letters Patent.  Patented Aug. 27, 1907.

Application filed April 29, 1907. Serial No. 370,948.

*To all whom it may concern:*

Be it known that we, THOMAS LEGGETT STURTEVANT and THOMAS JOSEPH STURTEVANT, citizens of the United States, residing, respectively, at Quincy and Wellesley, in the county of Norfolk and State of Massachusetts, have invented or discovered certain new and useful Improvements in Crushers, of which the following is a specification, reference being had therein to the accompanying drawings.

This invention relates to that class of vibrating jaw crushers the frames of which consist of relatively thin longitudinal steel plates to which are bolted, at front and rear, suitable cross-beams; and the invention has for its object to provide a crusher of this class which will be equal in capacity to two or more separate crushers, but which can be made at less cost than the separate crushers of equal capacity. Owing to the fact that these crushers frequently have to be transported in mountainous countries and over difficult roads it is desirable that they should be of the least possible weight consistent with proper strength and stiffness, and it is also desirable that they should not be made too large or ponderous, for the reason that, even if shipped in sections or knocked-down condition, the parts would be too heavy for convenient transportation. To increase the capacity of these crushers therefore, without making them so large as to require objectionably ponderous parts, the invention aims to provide such construction as will afford crushers of great efficiency and relatively large capacity for work, without making the parts too large and heavy.

In crushers of the class to which this invention relates and in which the side-plates are of relatively thin steel plates, so as to afford the greatest possible strength with a given weight of material, it is desirable to provide such bearings for the driving or cam shafts as will afford steady and solid supports for said shafts; as otherwise the bearings might spring under severe strain of the side-plates. In the present improved crusher, which may be either of duplex or triple construction, so as to have the capacity of two or three crushers of the same sized jaws, the bearings for the driving or cam shafts are supported by a sectional rear cross-beam bolted to the side-plates and to an intermediate plate or plates, so as to afford a bearing or bearings in the cross-beam intermediate the end-bearings, and which end-bearings preferably overhang the side-plates so as to afford large end-bearing surfaces for the cam shafts.

Figure 6:
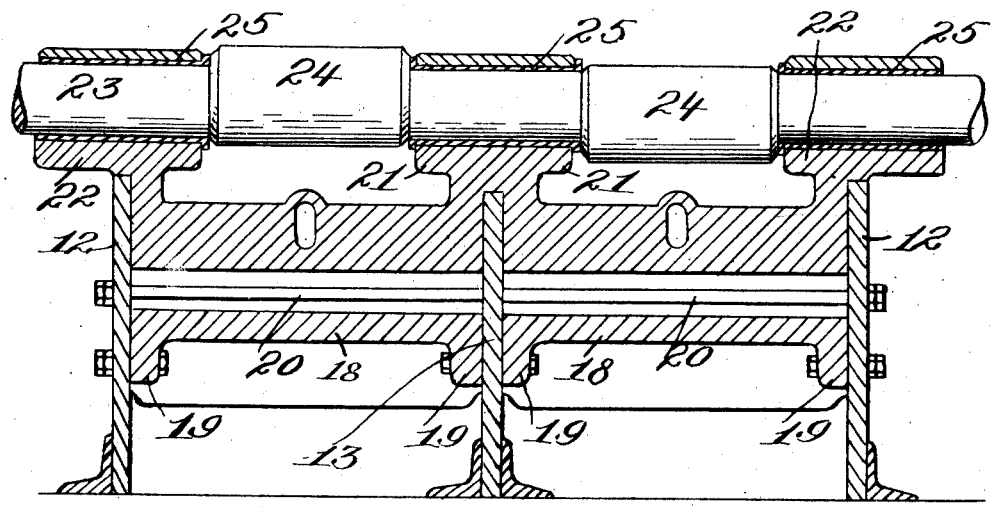

In the accompanying drawings, Figure 1 is a longitudinal section, partly in elevation, of the improved crusher. Figs. 2 and 3 are front and rear end views, respectively, of the same. Fig. 4 is a vertical transverse section of the same in the plane of the driving or cam shaft, and Fig. 5 is a view similar to Fig. 4 of a triple crusher constructed in accordance with the invention. Fig. 6 is a transverse section, similar to Fig. 4, showing the rear cross beam in one piece.

Referring to the drawings, 12 denotes the longitudinal steel side-plates of the frame of the crusher, and 13 an intermediate or middle plate similar in size and shape and extending parallel to the side-plates. Interposed between said side-plates and middle plate, at the front end of the machine, is a sectional head-block or front cross-beam 14 provided with suitable flanges 15 by which the parts of said sectional beam are bolted to said plates, said sectional block or beam being preferably apertured for the reception of tie-rods or bolts 16 extending from one side-plate to the other. On the said sectional head-block or cross-beam are mounted the stationary crushing jaw-plates or jaws 17. Interposed between said side-plates and middle plate, at the rear of the machine, is a sectional cross-beam 18 the parts of which are provided with flanges 19 by which they are bolted to the said side-plates and middle plate, said sectional rear cross-beam being also preferably apertured for the reception of a tie rod or rods 20 extending from one side plate to the other. The said sectional cross-beam 18 is provided with inner and outer bearing parts 21 and 22 for the driving or cam-shaft 23 carrying the cams or eccentrics 24. The outer bearings 22 for the said shaft preferably overhang the side-plates 12, so as to offer extended bearing surfaces; while the inner bearing parts 21 are preferably contiguous so as to afford a wide middle supporting bearing for the said shaft; all of the said bearings being preferably provided with bearing sleeves, 25, as is common in this class of machines.

Resting against the cams or eccentrics 24 are rollers 26 mounted on rocking arms 27 for operating the vibrating jaws 28 carrying the movable jaw plates 29, said rocking arms and vibrating jaws having their fulcrums at their lower ends on suitable cross-shafts or bearing rods 30 and 31 supported by the middle plate or plates 13 and removably mounted in the frame of the machine, and said arms and vibrating jaws being removably mounted on said shafts or rods, for convenient dismounting of the parts with a view to sectional transportation. Interposed between said rocking arms and vibrating jaws are thrust plates or toggles 32 seated in suitable bearing plates 33 on the said arms and jaws. The vibrating crushing jaws 28 are retracted, and the bearing rolls 26 on the rocking arms 27 are held in contact with their operating cams or eccentrics 24 through the medium of springs 34 encircling pull-back rods 35 connected at their forward ends to the said vibrating jaws 28; said springs being interposed between the rear cross-beams 18 and suitable nuts or collars 36 on said rods.

If it be desired to still further increase the capacity of the crusher beyond that of a duplex crusher, and without very greatly increasing the weight of any of the parts of the mill, the crushers may be made triple, as indicated by the sectional view, Fig. 5, which shows two intermediate plates 13 and a three-section cross-beam 18; or they may be made quadruplex, if desired, by adding other intermediate plates and cross-beam sections, as will be understood.

The stationary cross-shafts or bearing rods 30 and 31 are supported by the middle plate or plates 13, as hereinbefore stated, and pass through all of the plates 12 and 13. These stationary cross-shafts or bearing rods extend outward beyond the outer sides of the side plates or side pieces and are prevented from turning by clamp boxes each of which comprises a fixed part 37 having a flange 38, by which it is bolted to the outside of one of the side-plates 12, and a clamping cap 39 secured to the part 37 by bolts 40. Thus the cross-shafts or bearing rods encircled by the clamp boxes may be rigidly secured to the said side plates without the use of keys, thus permitting the use of plain shafts or rods requiring no machining.

The bearing or bearings for the driving or cam shaft, supported on the intermediate plate or plates 13, is an important feature of the present invention in that proper stiffness, under great stress, is thus afforded for the said shaft; and while it is preferred to form the rear cross-beam in two or more sections it will be understood that, with the use of the middle plate, the rear cross-beam might be in one part as shown in Fig. 6; the three-plate frame being an important feature of the invention, with or without a sectional or two-part rear cross-beam. Also the clamping boxes by which the stationary cross shafts or bearing rods are secured to the side plates is a desirable feature of our invention and is capable of use in crushers not embodying the other features of the invention herein described.

From the foregoing it will be understood that the present invention provides a crusher having the capacity of two or more crushers having similar sized jaws, but which may be made at a less cost than the separate crushers; while most of the separate or individual parts of the improved crusher need not be of greater weight than the similar parts of a single crusher; so that a crushing mill of large capacity, built in accordance with the present invention, can be shipped in sectional or knocked-down condition for convenient transportation over difficult roads, in that none of the parts need be objectionably ponderous or heavy. Another fact contributing to economy of construction of the improved duplex crusher is that nearly all the part of the machine are the same as similar parts of a single crusher, so that they can be made by the same jigs and templets as are used in making single crushers; and thus nearly the whole of a duplex crusher can be built by an assemblage of parts of two single crushers as heretofore constructed.

Having thus described our invention we claim and desire to secure by Letters Patent:

1. A crushing machine the frame of which comprises two longitudinal side plates, a parallel intermediate plate, and front and rear cross-beams separate from but secured to said plates, combined with a cam shaft having its bearings in said rear cross-beam.

2. A crushing machine the frame of which comprises two longitudinal side plates, a parallel intermediate plate, and sectional front and rear cross-beams separate from but secured to said plates, combined with a cam shaft having its bearings in said rear cross-beam.

3. A crushing machine the frame of which comprises two longitudinal side plates, a parallel intermediate plate, and front and rear cross-beams separate from but secured to said plates, combined with a driving or cam shaft having end bearings and an intermediate bearing in the said rear cross-beam, said intermediate bearing being steadied on said intermediate plate.

4. A crushing machine the frame of which comprises two longitudinal side plates, a parallel intermediate plate, and sectional front and rear cross-beams separate from but secured to said plates, combined with a driving or cam shaft having end bearings and an intermediate bearing in the said rear cross-beam, said intermediate bearing being steadied on said intermediate plate.

5. In a crushing machine the frame of which comprises two longitudinal side plates, a parallel intermediate plate, and front and rear cross-beams separate from but secured to said plates, combined with a driving or cam shaft having end bearings and an intermediate bearing in the said rear cross-beam, said intermediate bearing being steadied on said intermediate plate, and vibrating jaws and rocking arms operated from said shaft and removably mounted on said three-plate frame.

6. A crushing machine the frame of which comprises two longitudinal side plates, a parallel intermediate plate, and sectional front and rear cross-beams separate from but secured to said plates, combined with a driving or cam shaft having end bearings and an intermediate bearing in the said rear cross-beam, said intermediate bearing being steadied on said intermediate plate, and vibrating jaws and rocking arms operated from said shaft and removably mounted on said three-plate frame.

7. A vibrating crushing machine the frame of which comprises side plates, one or more intermediate plates, and front and rear cross beams formed separate from but secured to said plates, combined with a cam shaft having end bearings and one or more intermediate bearings in said rear cross beam, and vibrating jaws operated from said cam shaft.

8. A vibrating crushing machine the frame of which comprises side plates, one or more intermediate plates, and sectional front and rear cross beams formed separate from but secured to said plates, combined with a cam shaft having end bearings and one or more intermediate bearings in said rear cross-beam, and vibrating jaws operated from said cam-shaft.

9. A rocking jaw crusher comprising the combination with relatively thin side plates and one or more intermediate plates, of front and rear cross-beams interposed between and secured to said plates, a cam shaft having end bearings and one or more intermediate bearings in said rear cross beam, stationary and vibrating jaw plates, and means for operating said vibrating jaw plates from said shaft.

10. A rocking jaw crusher comprising the combination with relatively thin side plates and one or more intermediate plates, of sectional front and rear cross-beams interposed between and secured to said plates, a cam shaft having end bearings and one or more intermediate bearings in said rear cross beam, stationary and vibrating jaw plates, and means for operating said vibrating jaw plates from said shaft.

11. In a crushing machine, the combination with a frame comprising relatively thin side-plates, an intermediate plate or plates and front and rear cross beams formed separate from but rigidly attached to said plates, of a driving or cam shaft having end bearings and an intermediate bearing or bearings in said rear cross-beam, stationary jaw plates mounted on said front cross-beam, vibrating jaws pivoted at their lower ends and carrying movable jaw plates coöperating with said stationary jaw plates, and means for operating said vibrating jaws from said shaft.

12. In a crushing machine, the combination with a frame comprising relatively thin side-plates, an intermediate plate or plates and sectional front and rear cross beams formed separate from but rigidly attached to said plates, of a driving or cam shaft having end bearings and an intermediate bearing or bearings in said rear cross-beams, stationary jaw plates mounted on said front cross-beam, vibrating jaws pivoted at their lower ends and carrying movable jaw plates coöperating with said stationary jaw plates, and means for operating said vibrating jaws from said shaft.

13. In a crushing machine, the combination with a frame comprising relatively thin side-plates, an intermediate plate or plates and front and rear cross-beams formed separate from but rigidly attached to said plates, of a driving or cam shaft having end bearings and an intermediate bearing or bearings in said rear cross-beam, stationary jaw plates mounted on said front cross-beam, vibrating jaws pivoted at their lower ends and carrying jaw plates coöperating with said stationary jaw-plates, and means for operating said vibrating jaws from said shaft, said means comprising cams or eccentrics on said shaft, rocking arms provided with rollers engaging said cams or eccentrics, thrust-plates or toggles interposed between said rocking arms and said vibrating jaws, and springs, connected with said vibrating jaws, for retracting the latter and for holding said rollers in contact with said cams or eccentrics.

14. In a crushing machine, the combination with a frame comprising relatively thin side-plates, an intermediate plate or plates and sectional front and rear cross-beams formed separate from but rigidly attached to said plates, of a driving or cam shaft having end bearings and an intermediate bearing or bearings in said rear cross-beam, stationary jaw plates mounted on said front cross-beam, vibrating jaws pivoted at their lower ends and carrying jaw plates coöperating with said stationary jaw-plates, and means for operating said vibrating jaws from said shaft, said means comprising cams or eccentrics on said shaft, rocking arms provided with rollers engaging said cams or eccentrics, thrust-plates or toggles interposed between said rocking arms and said vibrating jaws, and springs, connected with said vibrating jaws, for retracting the latter and for holding said rollers in contact with said cams or eccentrics.

15. A duplex crushing machine the frame of which comprises side plates, a middle plate and front and rear cross-beams, combined with a driving or cam shaft having three bearings, a plurality of vibrating jaws and a plurality of rocking arms for operating said jaws, said parts being all detachably mounted or secured to provide a sectional crusher of large capacity capable of being shipped in knock-down condition, with its side plates and middle plate separated.

16. A duplex crushing machine the frame of which comprises side plates, a middle plate and sectional front and rear cross-beams, combined with a driving or cam shaft having three bearings, a plurality of vibrating jaws and a plurality of rocking arms for operating said jaws, said parts being all detachably mounted or secured to provide a sectional crusher of large capacity capable of being shipped in knock-down condition, with its side plates and middle plate separated.

17. In a crushing machine, the combination with the side pieces thereof, of one or more stationary cross-shafts or bearing rods extending through the side pieces of the crusher, and clamping boxes on the outside of said side pieces for holding said shafts or rods stationary, each of said clamping boxes comprising a fixed part bolted to a side piece and a clamping cap bolted to said fixed part.

In testimony whereof we affix our signatures, in presence of two witnesses.

THOMAS LEGGETT STURTEVANT.
THOMAS JOSEPH STURTEVANT.

Witnesses:
W. F. ELLIS,
L. H. STURTEVANT.